July 1, 1952     T. G. WHILE ET AL     2,601,730
DEMONSTRATING DEVICE

Filed April 5, 1951     2 SHEETS—SHEET 1

*INVENTOR.*
THOMAS G. WHILE
WALTER E. RAY

BY *R. L. Miller*
ATTORNEY

July 1, 1952     T. G. WHILE ET AL     2,601,730
DEMONSTRATING DEVICE
Filed April 5, 1951     2 SHEETS—SHEET 2
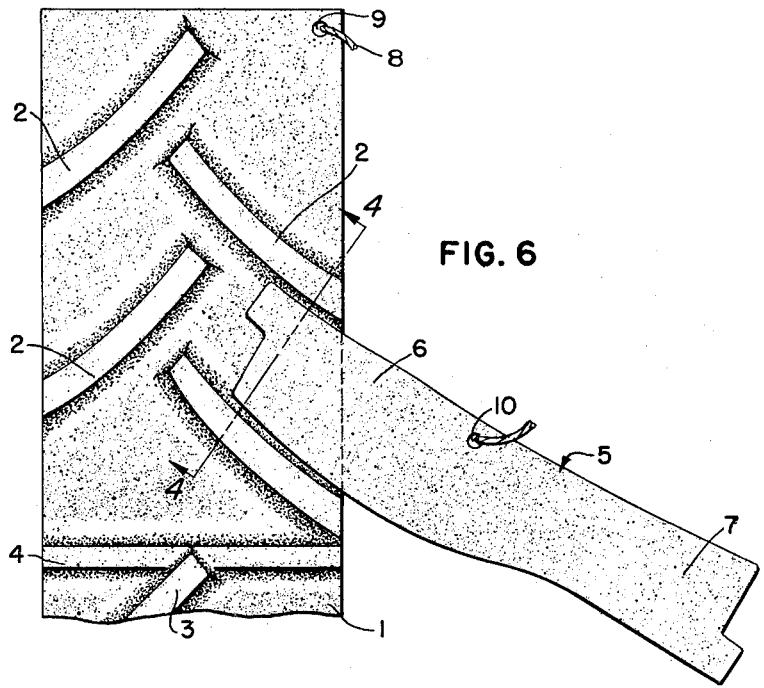
FIG. 6
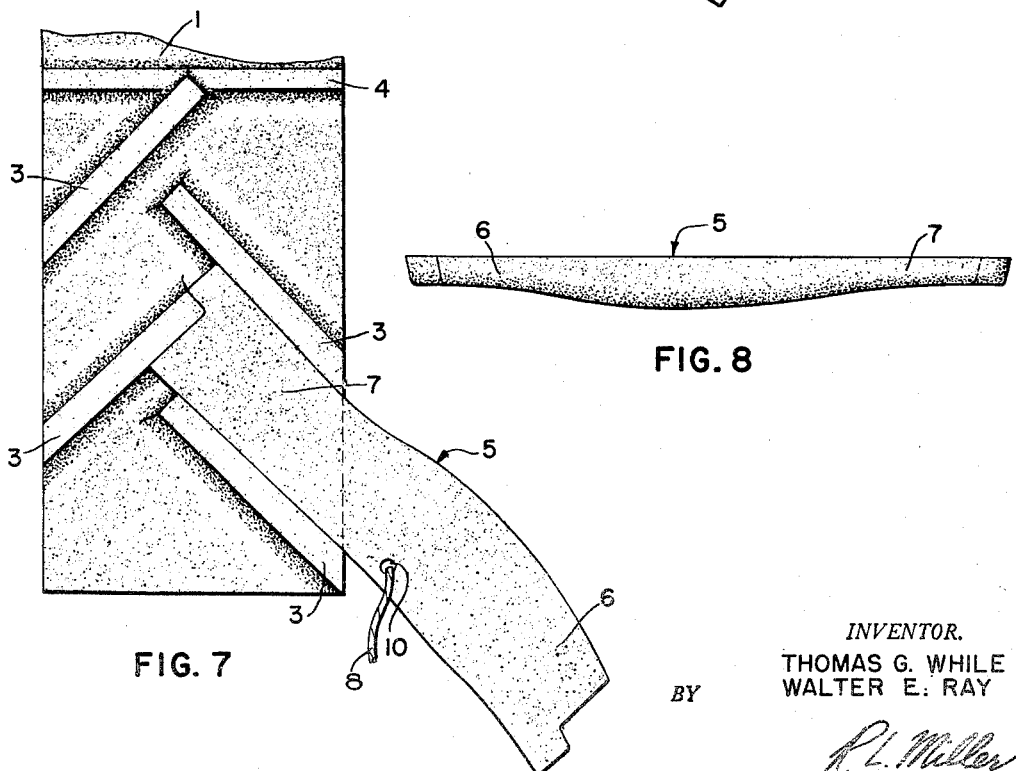
FIG. 7
FIG. 8
*INVENTOR.*
THOMAS G. WHILE
WALTER E. RAY
BY
*R. L. Miller*
ATTORNEY Patented July 1, 1952

2,601,730

UNITED STATES PATENT OFFICE 2,601,730

DEMONSTRATING DEVICE

Thomas G. While, Cuyahoga Falls, Ohio, and Walter E. Ray, Dearborn, Mich., assignors to Wingfoot Corporation, Akron, Ohio, a corporation of Delaware Application April 5, 1951, Serial No. 219,332

4 Claims. (Cl. 35—50)

The present invention relates to a demonstrating device particularly designed to demonstrate different characteristics of tire treads. In many cases, a salesman is not in a position to make a comparative demonstration between two actual tires under actual operating conditions and therefore it is helpful to have a small, handy, and easily manipulated device which will demonstrate the characteristics of different treads.

An object of this invention is to provide a simple, inexpensive demonstrating model that can be quickly put into action to demonstrate, in a few moments, the comparative actions of given types of treads.

Other objects of this invention will appear hereinafter as the description thereof proceeds, the various features, arrangements and combinations being clearly set forth in the specification and in the claims thereunto appended.

In the drawings:

Fig. 6 is a view similar to Fig. 1 with parts broken away and the parts in a different position with respect to each other;

Fig. 7 is a view similar to Fig. 1 with the parts in a different position with respect to each other; and Fig. 8 is a side elevation of the simulated soil pattern piece shown in Figs. 1, 2, 6 and 7.

Figure 1:
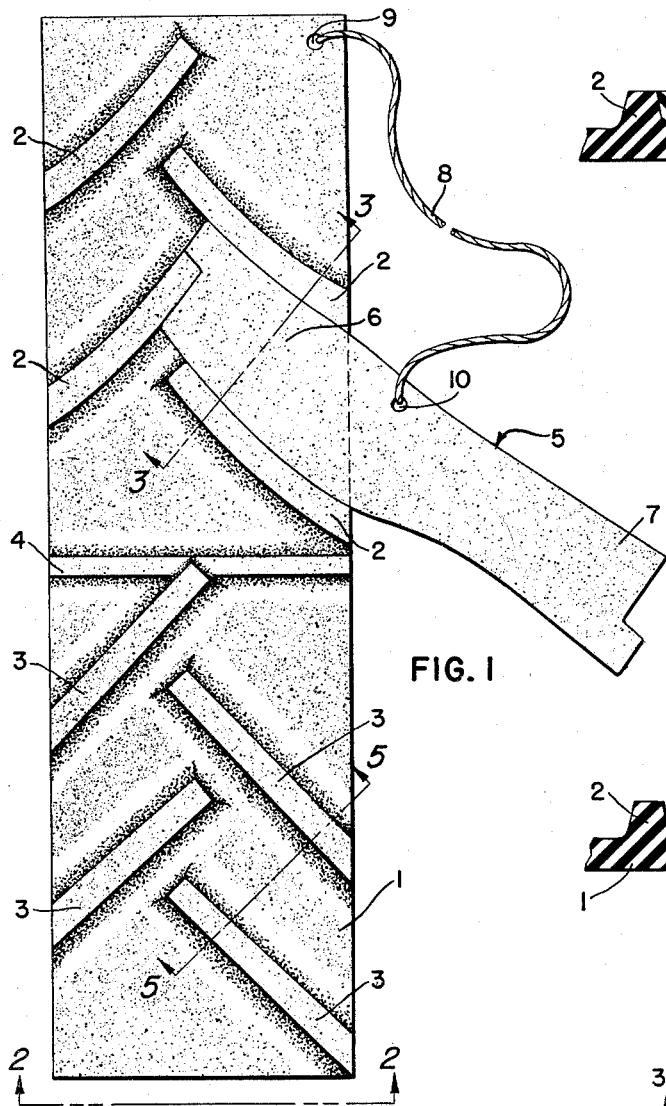
Fig. 1 is a plan view of the demonstrating device with parts thereof in assembled relation.

In Fig. 1, we have shown a strip 1, preferably of flexible material, such as rubber, which has on its upper surface two distinct tread patterns, one pattern being shown on the upper half of the strip and the other on the lower half of the strip. For the purposes of illustration, we have shown on the upper half what we will refer to hereafter as the curved rib design 2 and on the lower half we have shown what we shall refer to as the straight rib design 3. A distinctive rib or marking such as 4 can be used to indicate the division of the two designs.

The device is intended to demonstrate the gripping and cleaning action of the treads and for this purpose we have illustrated generally a simulated soil pattern piece which we shall refer to as 5. One end of this piece has a portion 6 which simulates the pattern for the curved rib design and the other end 7 has a simulated soil pattern corresponding to that which would be made by a straight rib design such as 3.

The members 5 and 1 are connected by a cord 8 or the like having end looped portions passing through holes 9 and 10 in the members 1 and 5, respectively, for the purpose of keeping the two parts together and for convenience in handling same.

Figure 4:
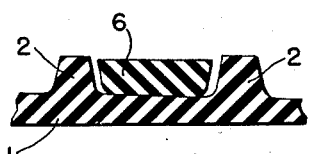
Fig. 4 is a cross-section taken along the line 4—4 of Fig. 6.
Figure 5:
Fig. 5 is a cross-section taken along the line 5—5 of Fig. 1.
Figure 2:
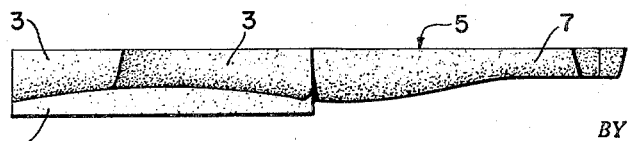
Fig. 2 is an end view looking in the direction 2—2 of Fig. 1.

In the curved rib design shown in Fig. 1 at 2, it will be noted that the ribs are spaced apart more at the edges of member 1 than at the center and therefore the soil pattern portion 6 is wider at the part which goes in between the ribs near the edge of the member 1 than at the center whereby, as illustrated in Fig. 4, the tapered effect easily releases the simulated soil pattern piece to the side of the member 1 which in general represents the tread surface of a tire. In other words, this demonstrates when the tire is in actual use there is a tendency for the soil to slip out from between the ribs and, of course, this being the case, it shows that the ribs will not have the desired gripping action on the soil because the soil will be displaced laterally. Conversely, the straight ribs in the tread pattern 3 are more closely spaced at the outer edges of the member 1 than at the center and, as shown in Fig. 7, the portion 7 of the soil pattern piece 5 could not be readily withdrawn from between the ribs and this demonstrates that the soil would be more likely to stay in position with this type of tread, thus giving more gripping action to the tread.

In using this demonstrating device, the salesman can, by switching from one end of the soil pattern piece 4 to the other end thereof, quickly demonstrate comparatively the action of two different tread designs or tread patterns. The tread patterns selected are merely for the purpose of illustration and are not intended to be limiting as far as the invention is concerned. One of the prime objects of the invention is to provide a comparative demonstrating device in which different tread patterns are used with the corresponding soil pattern to demonstrate the comparative value of one tread against the other without an actual tire demonstration. Preferably, the ribs or other tread design are formed on this flat demonstrating piece according to the actual tread print, which is the more or less flattened print formed by the under side of the tire when the tire is under load as distinguished from the shape of the ribs on an unstressed tire. The reason for doing this is to demonstrate the ground gripping action of the tire in actual use and therefore the tread design must be substantially the same as that occurring in the tread print, commonly referred to in the art as the "footprint" of the tire.

By having the part 1 flexible, the cleaning action of the tire can be demonstrated, especially in connection with the tread pattern 3 which tends to hold the soil in between the ribs when the ribs engage the ground. The salesman can demonstrate the cleaning action by showing that as the tread print, which is substantially flat, changes to a curved shape as the tread leaves the ground, the ribs spread apart at their outer edges, thus releasing the soil from between the ribs and, in fact, the change of contour of the member 1 to a curved form actually pushes the simulated soil pattern member 5 from between the ribs the same as the sand or other soil would be pushed from between the ribs in an actual tire.

Figure 3:
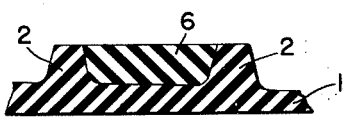
Fig. 3 is a cross-section on the line 3—3 of Fig. 1.

A more demonstrative method of using the device is to invert the member 1 so that the tread is against a flat surface while the member 5 is arranged in position between the ribs. In short, the parts would then be inverted from the position in Fig. 3. By then pulling on the free end of the member 5 while pressure is exerted on the member 1 to hold it against the flat surface, the ease of removal of the member 4 or the resistance to such removal may be quickly demonstrated.

Numerous other tests may be devised for comparing treads of different configurations but it is believed that those illustrations which have been given are sufficient for the purposes of disclosing this invention.

While certain representative embodiments and details have been shown for the purpose of illustrating the invention, it will be apparent to those skilled in this art that various changes and modifications may be made therein without departing from the spirit or scope of the invention.

Having thus fully described this invention, what we claim and desire to secure by Letters Patent of the United States is:

We claim:

1. A demonstrating device for demonstrating the action of the projecting portions of a tread of a tire when in use comprising a member having a face provided with a prototype of the tire tread design having projecting portions and a member selectively associated therewith of a shape to fit between adjacent projecting portions to simulate the soil pattern in between the projecting portions of such a tire in use.

2. A device as set forth in claim 1 in which the prototype has projecting portions of different spacings and said member has different contours thereon corresponding to the different spacings, one of which is adapted to fit the space between at least two projecting portions, and the other of which is of a shape adapted to fit between two projecting portions differently spaced.

3. A demonstrating device made of flexible material so as to be bendable, the surface of said device at least on one side thereof being provided with raised projections simulating a tread design and a member having a portion shaped to fit between adjacent projections to represent the soil pattern between similarly spaced projections on an actual tire tread of similar design.

4. A demonstrating device for demonstrating the action of the projecting portions of tire treads when in use comprising a member having a face provided with prototypes of at least two differently contoured tire tread designs, each having raised projections, and a member for selective association with either tread design having at least two distinct portions respectively simulating the soil pattern between projections of each of said different designs on the prototype.

THOMAS G. WHILE.
WALTER E. RAY.

No references cited.